(12) United States Patent
Cho et al.

(10) Patent No.: US 10,545,739 B2
(45) Date of Patent: Jan. 28, 2020

(54) LLVM-BASED SYSTEM C COMPILER FOR ARCHITECTURE SYNTHESIS

(71) Applicant: International Business Machines Corporation, Armonk, NY (US)

(72) Inventors: Minsik Cho, Austin, TX (US); Brian R. Konigsburg, Glen Burnie, MD (US); Indira Nair, Briarcliff Manor, NY (US); Haoxing Ren, Austin, TX (US); Jeonghee Shin, Sunnyvale, CA (US)

(73) Assignee: International Business Machines Corporation, Armonk, NY (US)

(*) Notice: Subject to any disclaimer, the term of this patent is extended or adjusted under 35 U.S.C. 154(b) by 624 days.

(21) Appl. No.: 15/091,093

(22) Filed: Apr. 5, 2016

(65) Prior Publication Data

US 2017/0286079 A1    Oct. 5, 2017

(51) Int. Cl.
*G06F 8/40* (2018.01)
*G06F 8/41* (2018.01)

(52) U.S. Cl.
CPC . *G06F 8/44* (2013.01); *G06F 8/40* (2013.01)

(58) Field of Classification Search
None
See application file for complete search history.

(56) References Cited

U.S. PATENT DOCUMENTS

| 6,389,379 | B1* | 5/2002 | Lin | G06F 17/5022 703/14 |
| 6,848,085 | B2 | 1/2005 | Panchul et al. | |
| 7,139,985 | B2* | 11/2006 | Jones | G06F 17/5045 716/113 |
| 7,904,850 | B2 | 3/2011 | Spackman et al. | |
| 8,156,481 | B1* | 4/2012 | Koh | G06F 8/35 717/151 |
| 8,229,723 | B2 | 7/2012 | Srinivasan et al. | |

(Continued)

OTHER PUBLICATIONS

Kaushik et al. "Systemc-clang: An open-source framework for analyzing mixed-abstraction SystemC models." Proceedings of the 2013 Forum on specification and Design Languages. Retrieved on [Jun. 4, 2019] Retrieved from the Internet: URL< https://ieeexplore.ieee.org/stamp/stamp.jsp?tp=&arnumber=6646649> (Year: 2013).*

(Continued)

*Primary Examiner* — S. Sough
*Assistant Examiner* — Cheneca Smith
(74) *Attorney, Agent, or Firm* — Samuel Waldbaum; Michael J. Chang, LLC (57) ABSTRACT

A low level virtual machine (LLVM)-based system C compiler for architecture synthesis is provided. In one aspect, a method for translating a system C model to hardware description language (HDL) is provided. The method includes the steps of: generating a hardware connection model (HCM) from the system C model, wherein the HCM defines modules and interconnects in a hardware system; parsing the system C model into a LLVM intermediate representation (IR); converting the LLVM IR to a system LLVM IR which records correspondence information between the LLVM IR and the HCM; and generating the HDL based on direct mapping of processes from the system LLVM IR and the HCM.

19 Claims, 12 Drawing Sheets

(56) References Cited

U.S. PATENT DOCUMENTS

| | | | |
|---|---|---|---|
| 8,370,822 B2 | 2/2013 | Sazegari et al. | |
| 8,806,403 B1* | 8/2014 | Denisenko | G06F 17/5054 |
| | | | 716/116 |
| 8,826,253 B2 | 9/2014 | Hernandez Porras et al. | |
| 8,943,487 B2 | 1/2015 | Li et al. | |
| 8,959,469 B2 | 2/2015 | Chen et al. | |
| 9,032,380 B1* | 5/2015 | Ruthramoorthy | G06F 8/443 |
| | | | 717/151 |
| 9,047,101 B2 | 6/2015 | Cabillic et al. | |
| 9,690,894 B1* | 6/2017 | Titley | G06F 17/505 |
| 9,824,173 B1* | 11/2017 | An | G06F 17/5054 |
| 2003/0191869 A1* | 10/2003 | Williams | G06F 17/5022 |
| | | | 719/328 |
| 2005/0229170 A1* | 10/2005 | Bellantoni | G06F 17/5022 |
| | | | 717/165 |
| 2007/0288874 A1* | 12/2007 | Czeck | G06F 17/5031 |
| | | | 716/102 |
| 2010/0146338 A1* | 6/2010 | Schalick | G06F 11/3648 |
| | | | 714/33 |
| 2013/0014091 A1* | 1/2013 | Oshinna | G06F 17/5045 |
| | | | 717/137 |
| 2013/0141443 A1 | 6/2013 | Schmit et al. | |
| 2014/0101636 A1* | 4/2014 | Correll | G06F 8/34 |
| | | | 717/113 |
| 2014/0164727 A1 | 6/2014 | Susnea et al. | |
| 2014/0258947 A1* | 9/2014 | Klimasauskas | G06F 17/505 |
| | | | 716/104 |
| 2014/0304687 A1 | 10/2014 | Hobbs et al. | |
| 2014/0325489 A1 | 10/2014 | Yoshida | |
| 2016/0132441 A1* | 5/2016 | Styles | G06F 13/28 |
| | | | 710/110 |
| 2016/0170727 A1 | 6/2016 | Mars et al. | |
| 2017/0116396 A1 | 4/2017 | Gu et al. | |
| 2017/0116410 A1 | 4/2017 | Wajs et al. | |

OTHER PUBLICATIONS

Calagar et al. "Source-level debugging for FPGA high-level synthesis." 2014 24th international conference on field programmable logic and applications (FPL). IEEE, 2014.Retrieved on [Jun. 4, 2019] Retrieved from the Internet: URL<https://ieeexplore.ieee.org/stamp/stamp.jsp?tp=&arnumber=6927496> (Year: 2014).*

Cong et al. "High-level synthesis for FPGAs: From prototyping to deployment." IEEE Transactions on Computer-Aided Design of Integrated Circuits and Systems 30.4 (2011): 473-491. Retrieved on [2019-09-10] Retrieved from the Internet:Url<https:// ieeexplore.ieee.org/stamp/stamp.jsp?tp=&arnumber=5737854> (Year: 2011).*

Ruan et al. "Elaboration-time synthesis of high-level language constructs in systemc-based microarchitectural simulators." 2010 IEEE International Conference on Computer Design. IEEE, 2010. Retrieved on [2019-09-10] Retrieved from the Internet:Url<https://ieeexplore.ieee.org/abstract/document/5647583> (Year: 2010).*

Zhang et al., "A LLVM Based Compiler for COFFEE," Object/Component/Service-Oriented Real-Time Distributed Computing (ISORC), 2013 IEEE 6th International Symposium on, Jun. 19-21, 2013, pp. 1-5.

Lattner et al., "LLVM: A Compilation Framework for Lifelong Program Analysis & Transformation," Code Generation and Optimization (CGO), 2004 IEEE International Symposium on, Mar. 20-24, 2004, pp. 75-86.

Abrar et al., "Abstraction of Clock Interface for Conversion of RTL VHDL to SystemC," Advance Computing Conference (IACC), 2014 IEEE International Conference on, Feb. 21-22, 2014, pp. 50-55.

Lattner, "LLVM: An Infrastructure for Multi-Stage Optimization," Masters Thesis, Computer Science Dept., University of Illinois at Urbana-Champaign (Dec. 2002).

* cited by examiner

Port/sc_signal conversion pass

```
define void @_ZN4TEST4procEv(%struct.TEST* %this) #3 align 2 {
entry:
 %c = alloca %"class.sc_dt::sc_uint", align 8
 %0 = bitcast %struct.TEST* %this to %"class.sc_core::sc_module"*
 call void @_ZN7sc_core9sc_module4waitEv(%"class.sc_core::sc_module"* %0)
 br label %while.body while.body:                    ; preds = %if.end, %entry
 %1 = load i32* @port3
 %cmp = icmp sgt i32 %1, 2
 br i1 %cmp, label %if.then, label %if.end if.then:                       ; preds = %while.body
 call void @_ZN5sc_dt7sc_uintILi8EEC1Ei(%"class.sc_dt::sc_uint"* %c, i32 100)
 store i32 %c, @port4
 call void @_ZN5sc_dt7sc_uintILi8EED1Ev(%"class.sc_dt::sc_uint"* %c)
 br label %if.end if.end:                        ; preds = %invoke.cont, %while.body
 %6 = bitcast %struct.TEST* %this to %"class.sc_core::sc_module"*
 call void @_ZN7sc_core9sc_module4waitEv(%"class.sc_core::sc_module"* %6)
 br label %while.body return:                        ; No predecessors!
 ret void
}
```

FIG. 3

System C datatype conversion pass

```
define void @_ZN4TEST4procEv(%struct.TEST* %this) #3 align 2 {
entry:
 call void @_ZN7sc_core9sc_module4waitEv(%"class.sc_core::sc_module"* %0)
 br label %while.body while.body:                    ; preds = %if.end, %entry
 %1 = load i32* @port3
 %cmp = icmp sgt i32 %1, 2
 br i1 %cmp, label %if.then, label %if.end if.then:                       ; preds = %while.body
 i32 %c = 100
 store i32 %c, @port4
 br label %if.end if.end:                        ; preds = %invoke.cont, %while.body
 %6 = bitcast %struct.TEST* %this to %"class.sc_core::sc_module"*
 call void @_ZN7sc_core9sc_module4waitEv(%"class.sc_core::sc_module"* %6)
 br label %while.body return:                        ; No predecessors!
 ret void
}
```

FIG. 4

Hardware Connection Model (HCM) –
this model is outside the LLVM bitcode

FIG. 5

S-LLVM
Ports/signals are global pointer variable
Processes are functions
Basic clocks with wait() are marked

FSM Processes in HDL

```
Signal state: std_ulogic;

Cthread: process (clock, states)

Procedure FSM_Cthread(
    current_state: in std_ulogic;
    next_state: out std_ulogic) is
...
End;

Variable next_state: std_ulogic;
Begin
-- state transition for cthread
If rising_edge(clock) then
    FSM_Cthread(state, next_state);
    state <= next_state;
End if;
End process Cthread;
```

Process for CThread

```
Signal input: std_ulogic;

Method: process (input: std_ulogic)

Procedure FSM_method( ) is
...
End;

Begin
-- no state transition for method
  FSM_method;

End process Method;
```

Process for Method

FIG. 10

Recursive CDF Traversal

```
generate_bb (BasicBlock bb)
{
    if (bb = end_bb_stack.top() ) return;
    for each instruction in bb
        visit instruction;
}
visitBrachInstruction (I)
{
    find Immediate Post Dominator(IPD) BB of current BB;
    push IPD_bb into end_bb_stack;
    generate_bb(if_bb);
    generate_bb(else_bb);
    pop ipd_bb from end_bb_stack;
}
```

FIG. 11 iDOM (D) = A
ipDOM(A) = F
F != D ➔ D is problematic iDOM (F) = A
ipDOM(A) = F
F = F ➔ F is OK

```
fix_function( Function F)
{
    build DOM and pDOM trees
    do {
        for each BasicBlock I with multiple predecessors in F
            if(ipDOM(iDOM(I)) != I) bad_BB_list.push_back(I);
        find a set of BasicBlocks in bad_BB_list that has no successor in bad_BB_list
        for each B in this set
            fix_basicblock(B);
    } while( bad_BB_list.no_empty())
} fix_basicblock (BasicBlock A)
{
    reverse traverse A to iDOM(A) and record all the conditions enables A
    add Condition Block in front of A, TRUE edge point to A, FALSE edge point to iDOM(A)
    find iPRED(ipDOM(A)) that are not successors of A and move its connection from ipDOM(A) to A
    rebuild DOM and pDOM trees
}
```

LLVM-BASED SYSTEM C COMPILER FOR ARCHITECTURE SYNTHESIS

FIELD OF THE INVENTION

The present invention relates to hardware design, and more particularly, to a low level virtual machine (LLVM)-based system C compiler for architecture synthesis.

BACKGROUND OF THE INVENTION

Computer-aided design or CAD systems are often employed in integrated circuit design and synthesis by taking a hardware design created from a high-level programming language to a hardware design implementation. See, for example, U.S. Pat. No. 6,848,085 issued to Panchul et al., entitled "System for Converting Hardware Designs in High-Level Programming Language to Hardware Implementations," (hereinafter "U.S. Pat. No. 6,848,085"). For instance, the techniques provided in U.S. Pat. No. 6,848,085 can take as input a C-type program representation of the hardware design, compile it into a register transfer level (RTL) hardware description language (HDL), and use that to synthesize a gate-level hardware representation.

With this process the high-level programming language, such as ANSI C, is a pure software language without any hardware concept. Hardware, however, requires I/O ports, finite state machine or FSM, storage elements, etc. in addition to the algorithm described in Boolean logic. The techniques described in U.S. Pat. No. 6,848,085 only govern the Boolean logic and create the FSM, I/O ports and storage elements in an unrestricted way. Thus, any specific definition of these hardware components cannot be accommodated.

Therefore, improved techniques are needed for modeling and architecture synthesis of complex circuits, such as microprocessors.

SUMMARY OF THE INVENTION

The present invention provides a low level virtual machine (LLVM)-based system C compiler for architecture synthesis. In one aspect of the invention, a method for translating a system C model to hardware description language (HDL) is provided. The method includes the steps of: generating a hardware connection model (HCM) from the system C model, wherein the HCM defines modules and interconnects in a hardware system; parsing the system C model into a LLVM intermediate representation (IR); converting the LLVM IR to a system LLVM IR which records correspondence information between the LLVM IR and the HCM; and generating the HDL based on direct mapping of processes from the system LLVM IR and the HCM.

A more complete understanding of the present invention, as well as further features and advantages of the present invention, will be obtained by reference to the following detailed description and drawings.

DETAILED DESCRIPTION OF PREFERRED EMBODIMENTS

Provided herein is a light weight System C to register transfer level (RTL) compiler for architecture synthesis of complex circuits such as microprocessors. As will be described in detail below, the present techniques advantageously support performance modeling, can be used to evaluate physical designs with the generated RTL, provide a linkage between performance and implementation, and can be used to explore an architecture design space.

Figure 1:
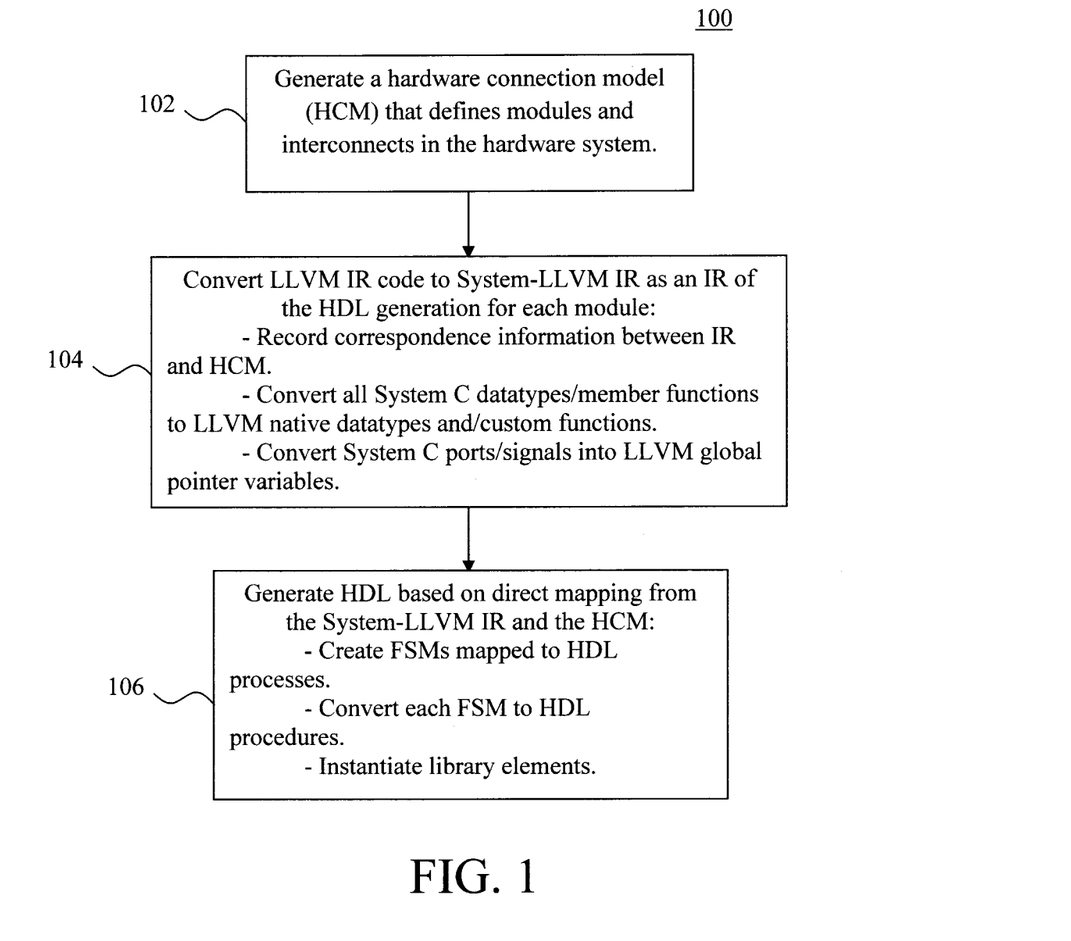
FIG. 1 is a diagram illustrating an exemplary methodology for translating System C to hardware description language (HDL) according to an embodiment of the present invention.

A general overall description of the present techniques is now provided by way of reference to methodology 100 of FIG. 1 for translating System C to hardware description language (HDL). In the instant example, the process is described in the context of a System C implementation. However, the present techniques are applicable to any other high level languages.

From System C, a hardware connection model (HCM) is generated in step 102. The HCM defines modules and interconnects in the hardware system, and supports dynamic module/port instantiations and templates. See below. The present compiler is based on an low level virtual machine (LLVM) compiler framework. As is known in the art, LLVM compilation involves three stages, the front end, optimization, and the back end. In the front end, the original language (e.g., system C) is parsed into an LLVM Intermediate Representation or IR code. The IR code is optimized, and then used to produce machine code in the back end. The IR code is important since it represents all of the high level concepts that will be used in the back end stage to produce the machine code optimized for a certain machine.

In step 104, the original LLVM IR code is converted to what is referred to herein as the System-LLVM Intermediate Representation (IR) (or S-LLVM IR) as an IR of the hardware description language (HDL) generation for each module. This conversion process is described in detail below. The System-LLVM IR records correspondence information (e.g., module and port references) between the IR and the HCM (see step 102 above). The System-LLVM IR also converts all system C datatypes and their member functions to LLVM native datatypes and custom functions, and converts system C ports and signal objects into LLVM global pointer variables. This System-LLVM IR is cycle accurate to the System C model. Once the System-LLVM IR and HCM are created, optimization transforms can be called on the System-LLVM IR to optimize the functions. This capability makes the present compiler extendable with additional transforms.

In step 106, HDL is generated based on direct mapping from the System-LLVM IR and the HCM. During the HDL generation process, finite-state machines (FSMs) are created for SystemC, Cthread and Method. These FSMs are mapped to HDL processes. Each FSM is then converted to HDL procedures and called within the HDL generation process. Library elements can also be instantiated when generating HDLs.

Figure 2:
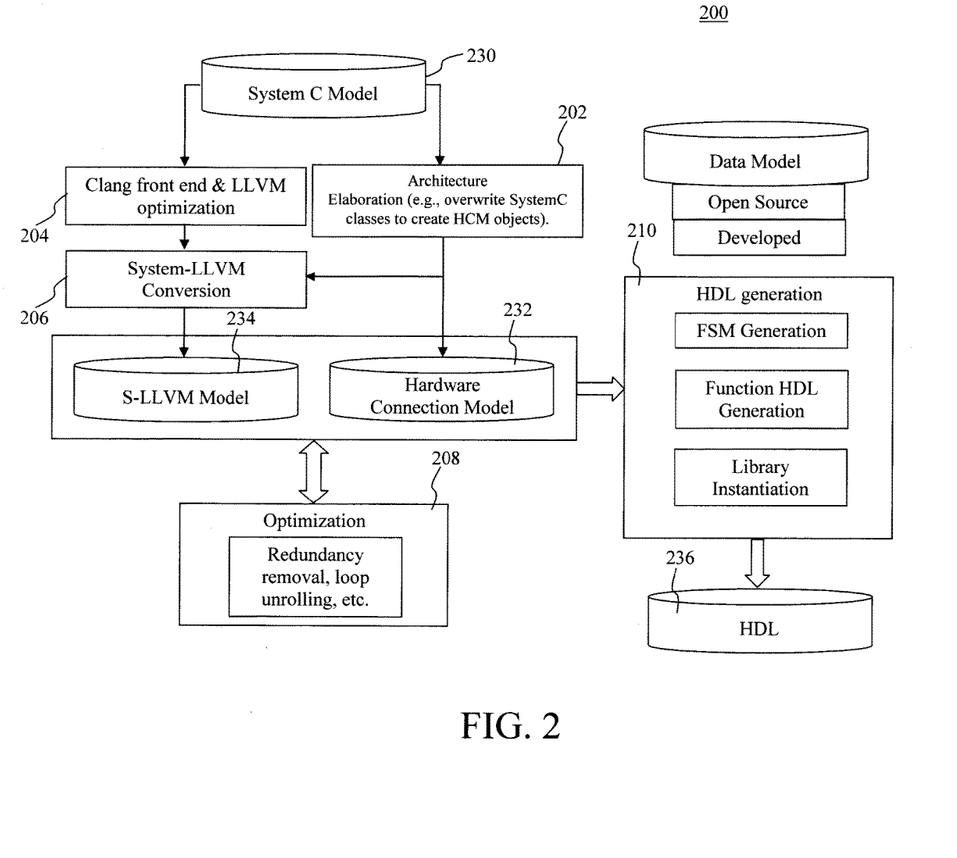
FIG. 2 is a diagram illustrating the present compiler architecture according to an embodiment of the present invention.

Given the above overview of the present techniques, FIG. 2 provides a detailed illustration of the present compiler architecture 200. As provided above, the process begins with a high level language, such as System C (see DataModel=data (SystemC input, IR model HCM model, final RTL) generated/worked on, as input 230. See FIG. 2. The "Data Model" in FIG. 2 represents the SystemC input worked on, as well as the IR model, HCM model, and final RTL generated/worked on. "Open Source" in FIG. 2 represents available LLVM resources (e.g., Clang (step 204, see below), and "Developed" represents what is presented/developed herein, e.g., the System-LLVM conversion, HCM creation, and HDL generation (steps 206, 202, and 210, respectively, see below).

The next task is to generate the HCM 232 which defines the modules and interconnects in the hardware system. As shown in FIG. 2, creating the HCM 232 involves architecture elaboration (see step 202).

According to an exemplary embodiment, step 202 involves, when System C objects (e.g., modules, ports, signals, etc.) are created, overwriting the System C classes to create objects for the HCM 232. For example, each System C object can be overwritten by a wrapper class. Each wrapper class will create an HCM object before it creates the real System C object. In this manner, one can run a full System C simulation up to the elaboration step during which, whenever a System C kernel creates a System C object, it also creates the corresponding HCM object. Doing so will enable dynamic instantiation of modules and connection of ports/signals.

As provided above, the present techniques follow a LLVM compiler framework. Thus, in step 204, an LLVM compiler front end (such as Clang) can be used to parse the System C language into LLVM IR code and the IR code optimized. The next task is to convert the LLVM IR code to System-LLVM IR code as a System-LLVM model 234 of the HDL generation for each module. See step 206.

Figure 3:
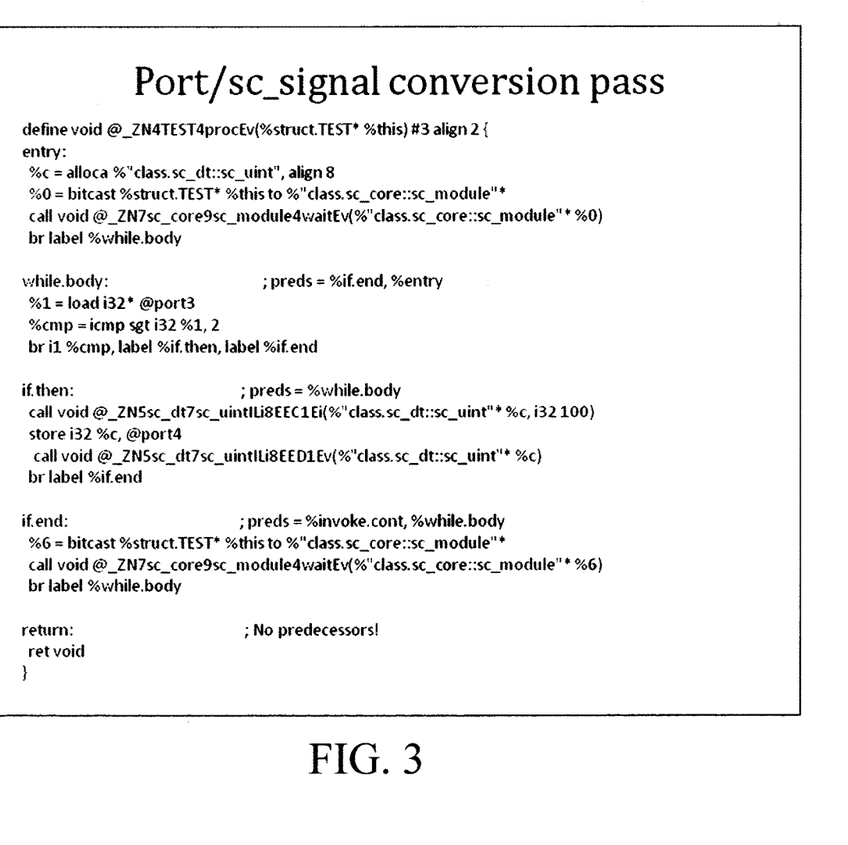
FIG. 3 provides an example of a port/sc_signal conversion pass according to an embodiment of the present invention.
Figure 4:
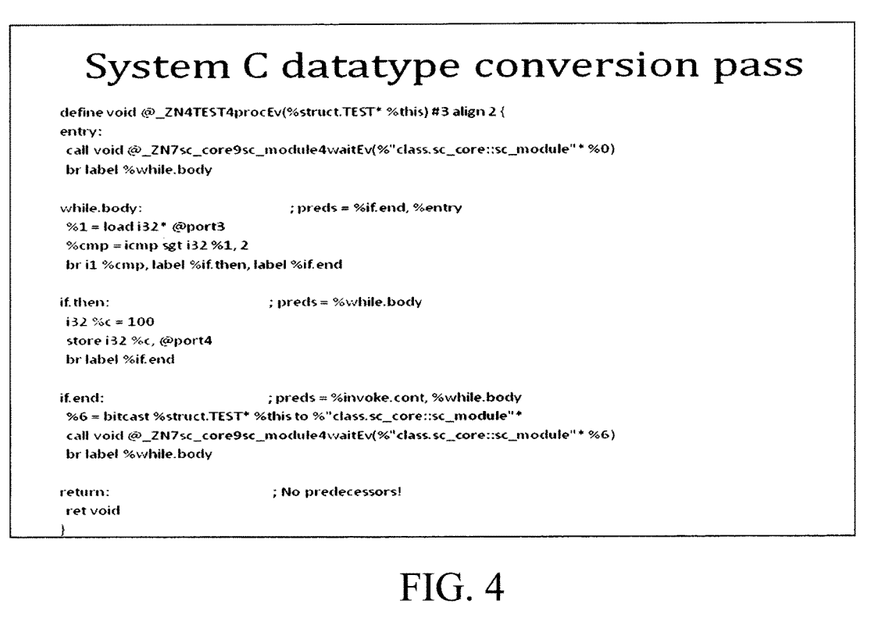
FIG. 4 provides an exemplar of a SystemC datatype conversion pass according to an embodiment of the present invention.

The System-LLVM IR records correspondence information between the IR and the HCM (see step 102 above). According to an exemplary embodiment, this conversion involves converting system C ports and signal objects into LLVM global pointer variables. For instance, global variable pointers are created from the ports/SystemC (sc)_signal record in the LLVM IR and correlated with the extracted HCM. As highlighted above, this conversion also involves converting all SystemC datatype variables into LLVM native datatypes, e.g., i32, i64, etc. It also converts bit/range functions to custom functions for RTL generation. An example of a port/sc_signal conversion pass is given in FIG. 3, and an example of a SystemC datatype conversion pass is given in FIG. 4.

Figure 5:
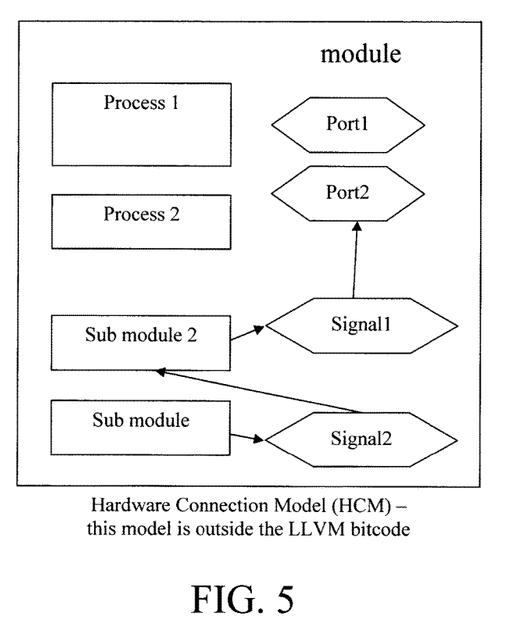
FIG. 5 is a diagram illustrating an exemplary Hardware Connection Model according to an embodiment of the present invention.
Figure 6:
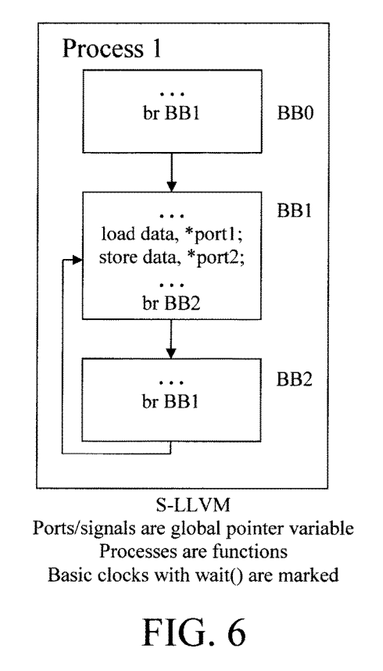
FIG. 6 is a diagram illustrating an exemplary System-LLVM according to an embodiment of the present invention.
Figure 7:
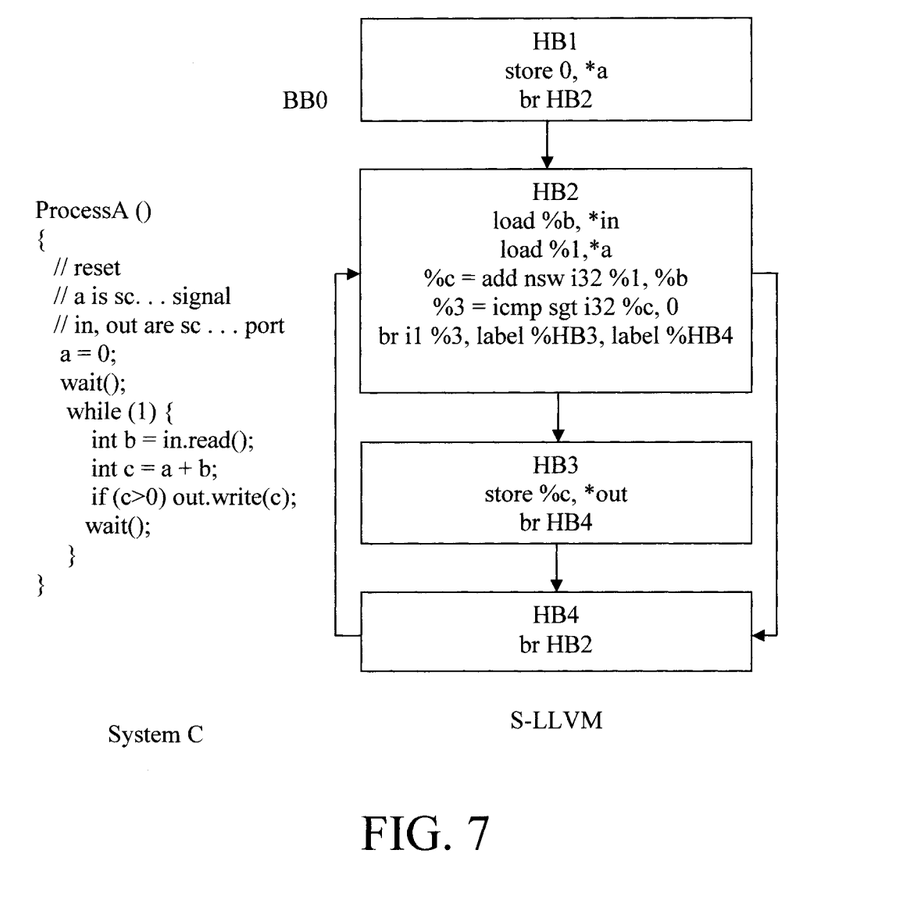
FIG. 7 is a diagram illustrating an example of original system C code and corresponding System-LLVM IR according to an embodiment of the present invention.

An exemplary HCM model is shown in FIG. 5, and an exemplary System-LLVM is shown in FIG. 6. As provided above, the HCM defines modules and interconnects in the hardware system. For instance, as shown schematically in FIG. 5, the HCM shown depicts a module instantiating several other (sub) modules, and the connection of their ports to various signals. FIG. 6 illustrates the System-LLVM IR for an exemplary process (Process 1). As shown in FIG. 6, global pointer variables are created for the system C ports and signals, the processes are custom functions, and the basic blocks (BB) with wait( ) are marked. See FIG. 7 for an example comparing the original system C code (labeled "System C") with a corresponding System-LLVM IR (labeled "S-LLVM").

The LLVM IR code to System-LLVM IR code conversion in step 206 involves port/sc_signal and System C datatype conversion. In the port/sc_signal conversion pass, global variable pointers from ports/sc_signal are created from the record in the LLVM IR and correlated with the extracted HCM 232. These global pointer variables replace the port/sc-signal reference in the LLVM. As shown, for instance, in the example provided in FIG. 7, read and write methods in system C are also replaced with load and store commands, respectively, during the port/sc_signal conversion pass.

In the system C datatype conversion pass, all system C datatype variables are converted into LLVM native datatypes, such as i32, i64, etc. (see, for example, FIG. 7), and function calls on those system C variables are converted to LLVM native instructions, such as shift, truncate, etc. Bit/range functions are converted to custom functions for RTL compiler generation.

Once the HCM 232 and System-LLVM IR 234 are created, optimization transforms can be called on the System-LLVM IR to optimize the functions. See step 208 of FIG. 2. The goal of the optimization is to improve the quality of the HDL. Generally, the optimization involves removing redundancy, loop unrolling, etc. Many existing LLVM optimization techniques can be leveraged for this purpose. See, for example, Lattner, "LLVM: An Infrastructure for Multi-Stage Optimization," Masters Thesis, Computer Science Dept., University of Illinois at Urbana-Champaign (December 2002), the contents of which are incorporated by reference as if fully set forth herein.

HDL 236 is then generated based on direct mapping from the HCM 232 and the System-LLVM 234. As shown in step 210 of FIG. 2, this generally involves FSM generation, function code generation, and library instantiation. In the HDL 236 architecture, hardware modules in the HCM 232 are mapped to entities in the HDL 236, and ports and signals in the HCM 232 are mapped to ports and signals in the HDL 236. Connections between objects in the HDM 232 equate with wires in the HDL 236.

FSM generation includes creating a FSM function for each HCM 232/System-LLVM 234 Cthread/method mapped HDL process. Function code generation includes generating HDL code for each of the FSM functions that are created. Library elements can be instantiated when generating HDLs.

FSM generation: FSM generation for method mapped HDL processes is fairly straightforward since it involves a direct mapping of the method function to the FSM function. There is no state transition and no inferred latch from System-LLVM 234.

Figure 8:
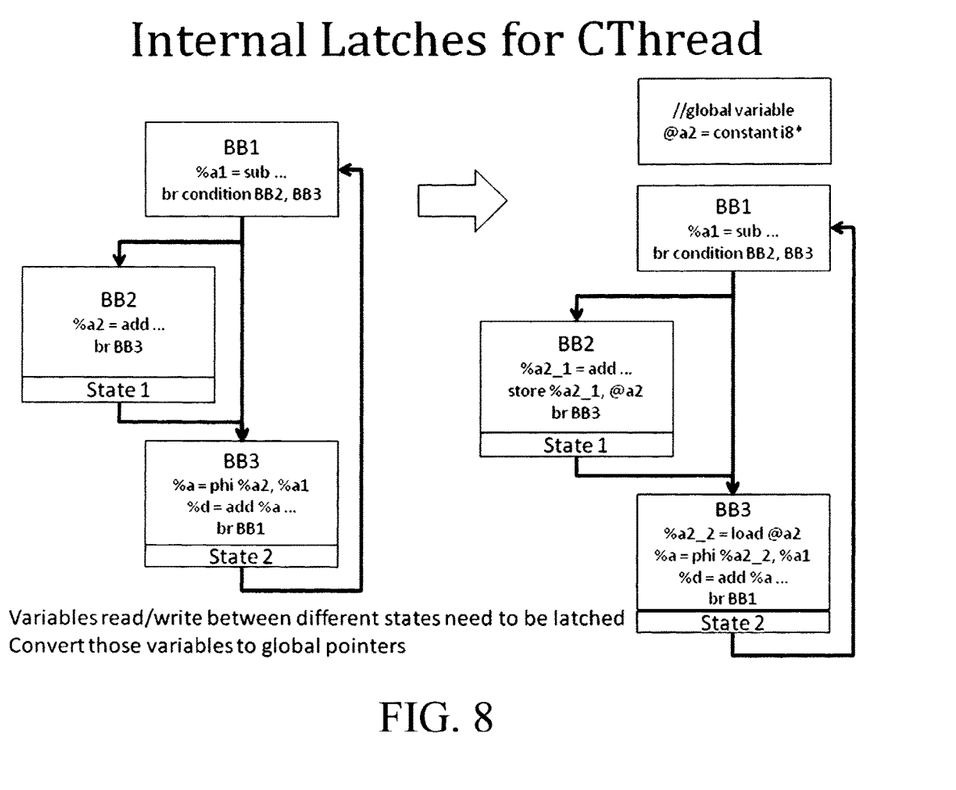
FIG. 8 is a diagram illustrating internal latches for different states of Cthread according to an embodiment of the present invention.

According to an exemplary embodiment, FSM generation for Cthread mapped HDL processes involves creating states based on wait( ), wherein basic blocks are separated based on the boundary of wait( ). State to state transition dataflow can be traversed to create a transition table. For instance, internal latches can be used for each Cthread. See FIG. 8. As shown in FIG. 8, read/write variables between different states, i.e., State 1 and State 2, are latched. Those read/write variables are then converted to global pointer variables. See FIG. 8.

Figure 9:
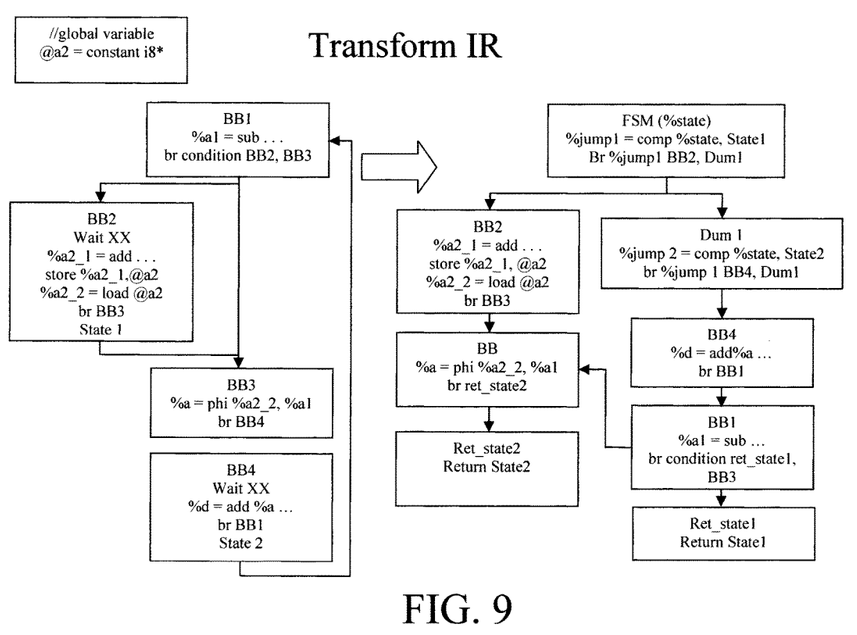
FIG. 9 is a diagram illustrating conversion of an finite-state machine (FSM) to a function input and output state variables according to an embodiment of the present invention.

FSM generation for Cthread mapped HDL processes also involves making LLVM functions to generate transition decision variables, which will be compiled into HDL procedures to be incorporated later into the final HDL 236. See, for example, FIG. 9. As shown in FIG. 9, the FSM (with global pointer variables) is converted to a function with input and output state variables.

Figure 10:
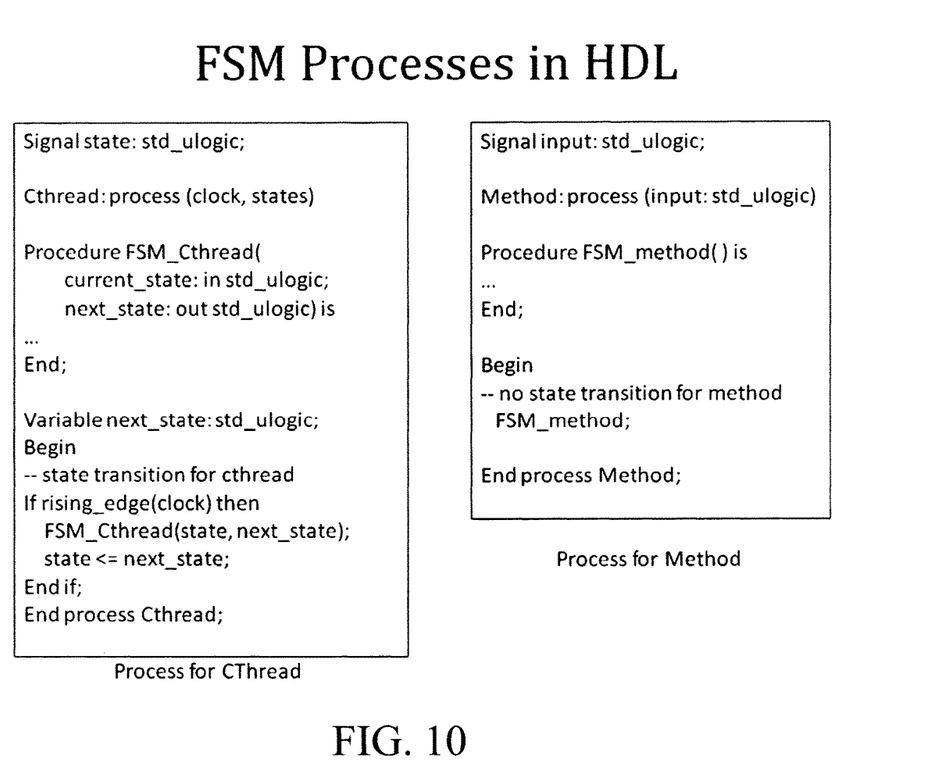
FIG. 10 is a diagram illustrating examples of FSM processes created for an HCM Cthread and method according to an embodiment of the present invention.

FSM processes can then be generated which will be copied over to the final HDL 236. See, for example, FIG. 10. FIG. 10 illustrates examples of FSM processes created for an HCM Cthread and method. As shown in FIG. 10, the FSM process does not involve a state transition, whereas internal latches are employed in the FSM process for Cthread to latch different states.

Function code generation: during function code generation, each FSM is converted to HDL procedures. Namely, HDL code is created for each of the FSM functions by converting datatypes, data flow instructions, control flow instructions, array/structure/pointer instructions, Alloca/Bitcast/Pointer instructions, and function calls to HDL procedures.

Datatype conversion involves transforming integer, Boolean and structure/class datatypes to HDL code. For example, integer datatypes are converted to unsigned datatypes (e.g., i8 is converted to std_ulogic_vector (7 down to 0) in vhdl, Boolean datatypes are converted to bit (e.g., i1 is converted to bit), array data types are converted to HDL array (e.g., [8×i8] is converted to array (7 downto 0) of unsigned (7 downto 0), and structure/class datatypes are converted to HDL record (e.g., {i8, i32} is converted to record member_0: unsigned {7 downto 0}; member_1: unsigned {31 downto 0}; end record).

Data flow instructions are converted to their HDL counterparts. For instance, binary operators such as arithmetic (e.g., Add, Sub, Mul, Div, Rem, etc.), logic (e.g., And, Or, Xor), and Bit (e.g., Chl, Lshr, Srl, Sra) data flow instructions are converted to their HDL counterparts. Select instructions (e.g., % X=select i1 true, i8 17, 18 42) are converted to if/else/then statement in HDL. Compare instructions (e.g., Eq, Ne, Le, Ge, Lt, Gt, etc.) are converted to HDL comparison statements.

Figure 11:
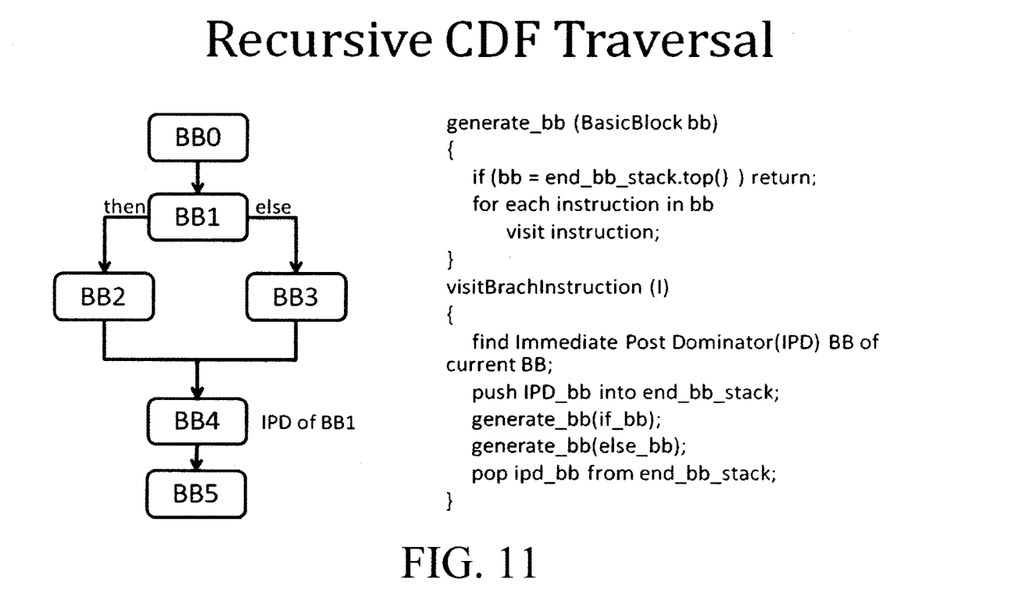
FIG. 11 is a diagram illustrating an example of control flow instructions having been converted to HDL procedures according to an embodiment of the present invention.

Control flow instructions are converted in the following manner. A PHI node variable is assigned each unconditional branch in the flow control. Each conditional branch is converted to if/else/then in HDL and the control flow graph is recursively traversed to map basic blocks (BB). See, for example, FIG. 11 (a recursive control-data-flow (CDF) graph). FIG. 11 illustrates a basic block map which includes if-then-(else) statements.

Switch statements are converted to case/when in HDL. Loop statements are modeled using branch instructions in LLVM. Loop statements should be unrolled and any optimization, such as pipelining, should occur before HDL mapping.

Figure 12:
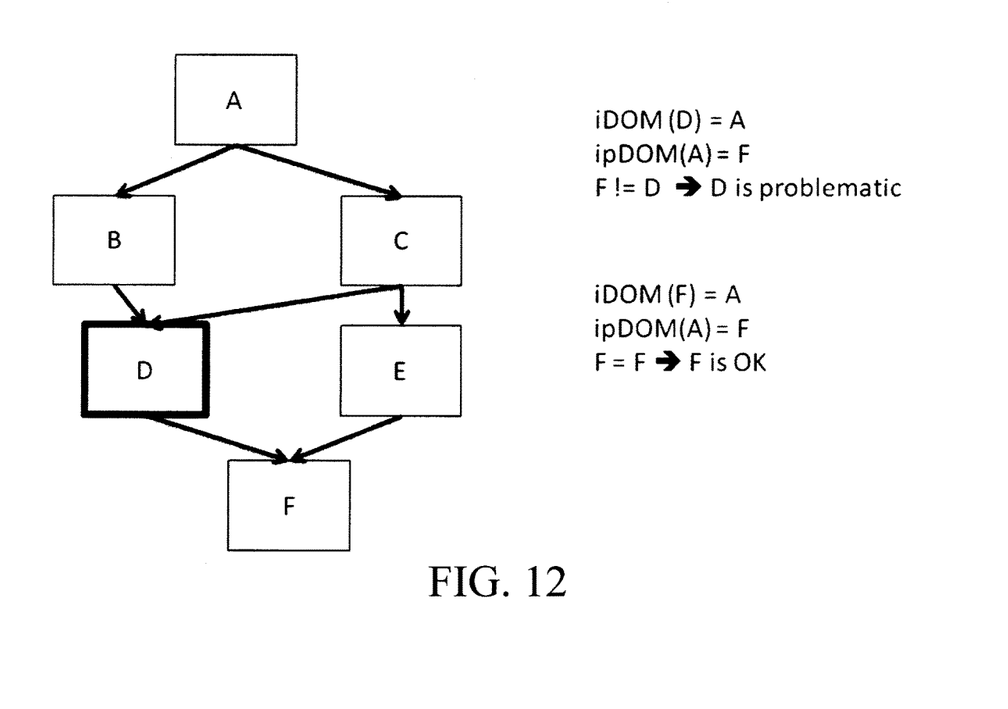
FIG. 12 is a diagram illustrating an example of basic blocks in a control flow needing conversion, where an if/then/else solution cannot be found according to an embodiment of the present invention.
Figure 13:
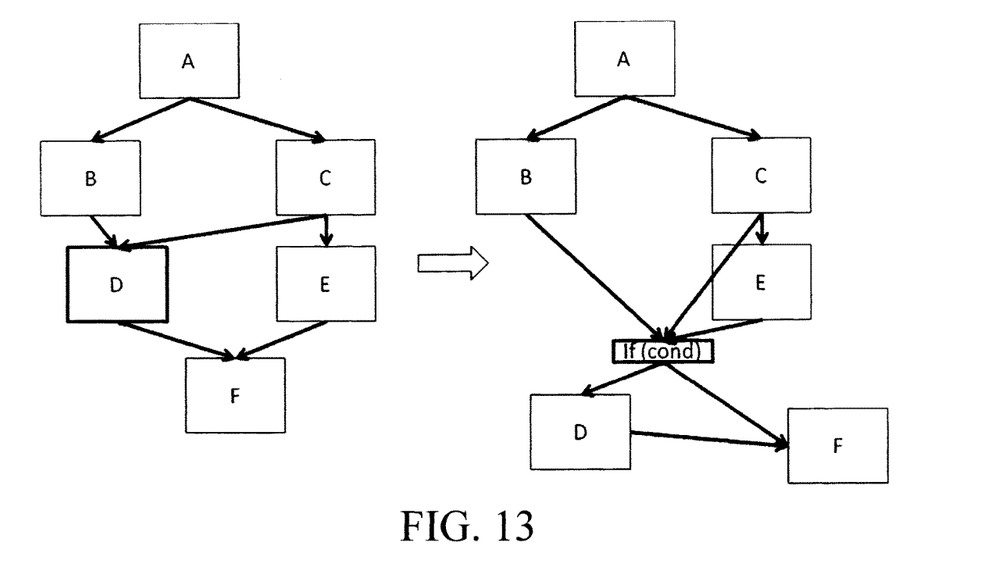
FIG. 13 is a diagram illustrating a possible solution to the problem raised in FIG. 12 according to an embodiment of the present invention.
Figure 14:
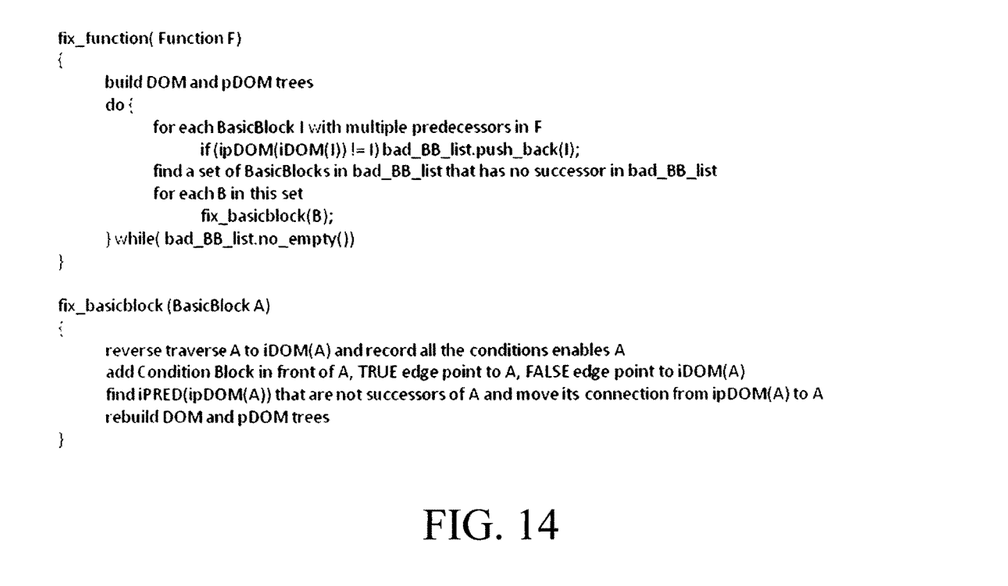
FIG. 14 is a diagram illustrating an exemplary algorithm for control flow conversion according to an embodiment of the present invention.

The control flow conversion is further illustrated by the following examples provided in FIGS. 12-15. FIG. 12 illustrates an example of blocks needing conversion. As shown in FIG. 12, there is a block D which has multiple predecessors in the function. The immediate dominator of block D is not immediately post dominated by this block. Thus, an if/then/else solution cannot be found, i.e., block D is problematic. While block F also has multiple predecessors, the immediate dominator of block F is post dominated by F, so block F is not problematic. A possible solution to this problem posed by block D is given in FIG. 13. Namely, as shown in FIG. 13, the control flow conversion is carried out in this case by moving block D out, and adding an extra condition (i.e., If (cond)). An exemplary conversion algorithm is provided in FIG. 14 which provides a solution for problematic blocks during the conversion, such as block D in the preceding example.

Figure 15:
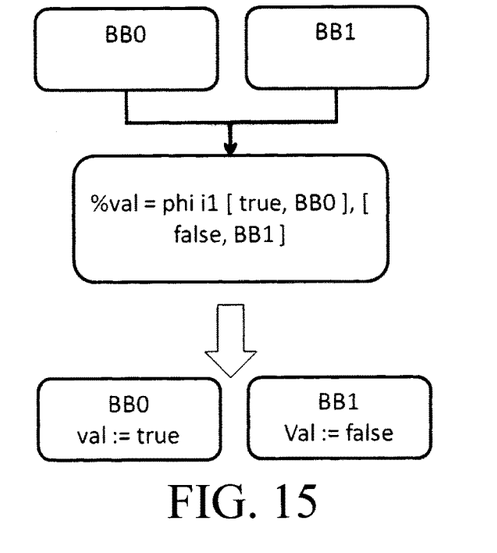
FIG. 15 is a diagram illustrating an example of assigning a PHI node variable to unconditional branches according to an embodiment of the present invention.

As provided above, the control flow conversion involves assigning a PHI node variable to unconditional branches. FIG. 15 provides an example of this scenario. As shown in FIG. 15, a PHI node variable is assigned to an unconditional branch between basic blocks BB0 and BB1. Its value will depend on from which block the control comes from. For instance, in this example, if the control comes from BB0 then the value of the PHI node variable is true, and if the control comes from BB1 then the value is false. The HDL assignment for the PHI node is added in the next basic block (BB) when processing a branch instruction.

Array, structure, and pointer instructions are converted to HDL procedures in the following manner. Pointer arithmetic is used to access the array and structure. For instance, %t2=getelementptr %struct.ST* %t1, i32 0, i32 2; yields %t1.3$^{rd}$_member and %t5=getelementptr [20×i32]* %t4, i32 0, i32 13; yields %t5[13]. The base pointer is the HDL variable. Getelementptr is translated to array or structure member access. This is used to determine which element of an array or which member of struct is being referenced.

Load/store instructions are mapped to the HDL assignment. For instance, port/signal converted (see above) global variables are mapped to concurrent assignments <=, and local port/signal converted local variables are mapped to variable assignments :=.

Alloca instructions in the control flow create a pointer to a datatype. According to an exemplary embodiment, these instructions are handled by converting them to an HDL variable, and eliminating the pointer (e.g., % v=alloca *i8 is converted to v: unsigned (7 downto 0). Bitcast changes the types of a variable. However, HDL types cannot be changed and therefore bitcast is not supported. Similarly, Pointer arithmetic is not supported since HDL does not have flat memory space. Thus, source code should be modified to remove bitcast and pointer arithmetic instructions.

For function calls, LLVM functions are converted into HDL procedures, wherein function arguments are the inputs and function return type is the output. Message display functions, such as cout, printf, etc. can be translated as HDL report statements automatically.

Library instantiation: Certain HCM modules can be mapped as predefined HDL modules, e.g., static random access memory (SRAM) modules. HDL libraries can be used on certain LLVM operators. For instance, select operators can be mapped to HDL multiplexer (MUX), */+− operators can be mapped to HDL multiplier/divider/adder/subtractors, etc. Preferably, this mapping is done automatically. Complicated library elements can be initialized as function calls in LLVM. For instance, predefined functions can be directly mapped to HDL library.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 16:
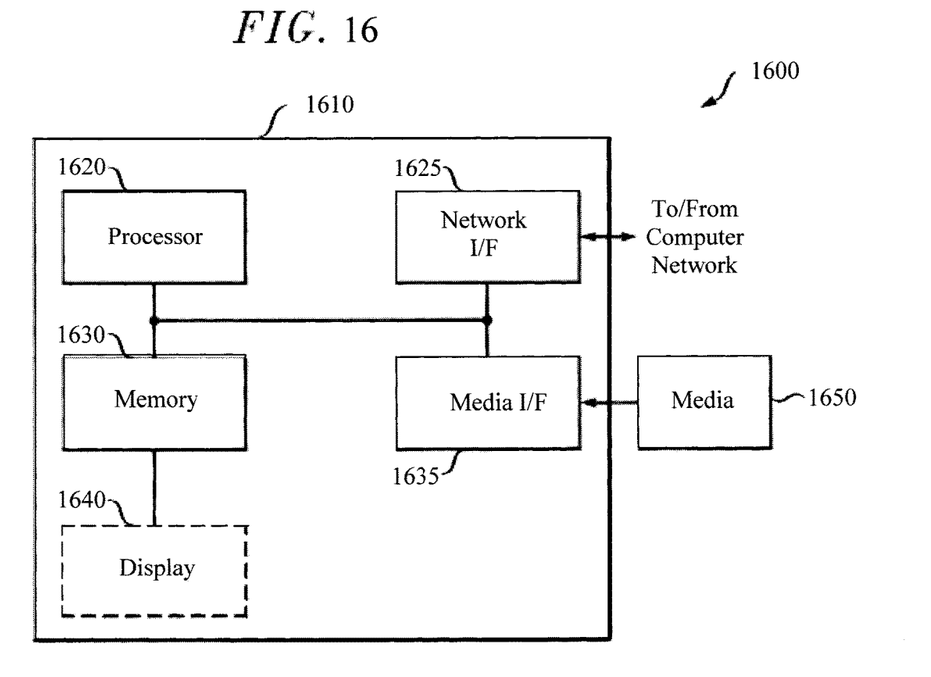
FIG. 16 is a diagram illustrating an exemplary apparatus for performing one or more of the methodologies presented herein according to an embodiment of the present invention.

Turning now to FIG. 16, a block diagram is shown of an apparatus 1600 for implementing one or more of the methodologies presented herein. By way of example only, apparatus 1600 can be configured to implement one or more of the steps of methodology 100 of FIG. 1 and/or one or more of the steps of methodology 200 of FIG. 2.

Apparatus 1600 includes a computer system 1610 and removable media 1650. Computer system 1610 includes a processor device 1620, a network interface 1625, a memory 1630, a media interface 1635 and an optional display 1640. Network interface 1625 allows computer system 1610 to connect to a network, while media interface 1635 allows computer system 1610 to interact with media, such as a hard drive or removable media 1650.

Processor device 1620 can be configured to implement the methods, steps, and functions disclosed herein. The memory 1630 could be distributed or local and the processor device 1620 could be distributed or singular. The memory 1630 could be implemented as an electrical, magnetic or optical memory, or any combination of these or other types of storage devices. Moreover, the term "memory" should be construed broadly enough to encompass any information able to be read from, or written to, an address in the addressable space accessed by processor device 1620. With this definition, information on a network, accessible through network interface 1625, is still within memory 1630 because the processor device 1620 can retrieve the information from the network. It should be noted that each distributed processor that makes up processor device 1620 generally contains its own addressable memory space. It should also be noted that some or all of computer system 1610 can be incorporated into an application-specific or general-use integrated circuit.

Optional display 1640 is any type of display suitable for interacting with a human user of apparatus 1600. Generally, display 1640 is a computer monitor or other similar display.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method for translating a system C model to hardware description language (HDL), comprising:
generating a hardware connection model (HCM) from the system C model, wherein the HCM defines modules and interconnects in a hardware system;
after the HCM has been generated, separately parsing the system C model into a low level virtual machine (LLVM) intermediate representation (IR);
converting the LLVM IR to a system LLVM IR which records correspondence information between the LLVM IR and the HCM by converting system C ports and signals into global pointer variables that are correlated with the HCM in the system LLVM IR; and
generating the HDL based on direct mapping of processes from the system LLVM IR and the HCM.

2. The method of claim 1, wherein generating the HCM from the system C model comprises:
overwriting the classes in the system C model to create objects for the HCM.

3. The method of claim 2, wherein the classes comprise one or more of modules, ports, and signals.

4. The method of claim 2, wherein the classes are overwritten by a wrapper class that creates the objects for the HCM.

5. The method of claim 1, wherein the system C model is parsed into the LLVM IR using a front end compiler.

6. The method of claim 1, wherein converting the LLVM IR to the system LLVM IR further comprises:
replacing read methods in system C with load commands; and
replacing write methods in system C with store commands.

7. The method of claim 1, wherein converting the LLVM IR to the system LLVM IR comprises:
converting system C datatype variables into LLVM native datatypes.

8. The method of claim 1, wherein converting the LLVM IR to the system LLVM IR comprises:
converting function calls on system C datatype variables into LLVM native instructions.

9. The method of claim 1, wherein converting the LLVM IR to the system LLVM IR comprises:
converting system C member functions to custom functions for register transfer level (RTL) compiler generation.

10. The method of claim 1, wherein generating the HDL comprises:
generating finite state machines (FSMs) mapped to HDL processes.

11. The method of claim 10, further comprising:
creating FSM functions for each of the processes mapped from the system LLVM IR and the HCM.

12. The method of claim 10, further comprising:
converting each of the FSMs to HDL procedures.

13. The method of claim 12, further comprising:
generating HDL code for each of FSM functions that are created.

14. The method of claim 10, further comprising:
instantiating library elements.

15. The method of claim 14, further comprising:
mapping one or more modules in the HCM as predefined modules in HDL.

16. A computer program product for translating a system C model to HDL, the computer program product comprising a computer readable storage medium having program instructions embodied therewith, the program instructions executable by a computer to cause the computer to:
generate an HCM from the system C model, wherein the HCM defines modules and interconnects in a hardware system;
after the HCM has been generated, separately parse the system C model into a LLVM IR;
convert the LLVM IR to a system LLVM IR which records correspondence information between the LLVM IR and the HCM by converting system C ports and signals into global pointer variables that are correlated with the HCM in the system LLVM IR; and
generate the HDL based on direct mapping of processes from the system LLVM IR and the HCM.

17. The computer program product of claim 16, wherein the program instructions when converting the LLVM IR code to the system LLVM IR further cause the computer to:
convert system C datatype variables into LLVM native datatypes; and
convert system C member functions to custom functions for RTL compiler generation.

18. The computer program product of claim 16, wherein the program instructions when generating the HDL further cause the computer to:
  generate FSMs mapped to HDL processes; and
  convert each of the FSMs to HDL procedures.

19. The computer program product of claim 16, wherein the program instructions when generating the HDL further cause the computer to:
  instantiate library elements.

* * * * *